(12) United States Patent
Toya

(10) Patent No.: US 7,574,905 B2
(45) Date of Patent: Aug. 18, 2009

(54) APPARATUS FOR DIAGNOSING MALFUNCTIONING OF OXYGEN SENSOR

(75) Inventor: Masanori Toya, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 32 days.

(21) Appl. No.: 12/013,566

(22) Filed: Jan. 14, 2008

(65) Prior Publication Data
US 2008/0276698 A1    Nov. 13, 2008

(30) Foreign Application Priority Data
Jan. 12, 2007    (JP)    ............................. 2007-004692

(51) Int. Cl.
*G01M 15/10*    (2006.01)
(52) U.S. Cl. .................................. 73/114.73
(58) Field of Classification Search ............. 73/114.69, 73/114.71, 114.72, 114.73, 114.75
See application file for complete search history.

(56) References Cited

U.S. PATENT DOCUMENTS 5,927,260 A * 7/1999 Kishimoto et al. .......... 123/688
6,711,932 B2 * 3/2004 Iwazaki et al. ............... 73/1.06
7,444,235 B2 * 10/2008 Anilovich et al. ........... 701/114
2003/0005746 A1 * 1/2003 Iwazaki et al. ............... 73/1.06

FOREIGN PATENT DOCUMENTS

| JP | 05-005447 A | 1/1993 |
| JP | 2003-343339 A | 12/2003 |
| JP | 2004-211602 A | 7/2004 |

* cited by examiner

Primary Examiner—Eric S McCall
(74) Attorney, Agent, or Firm—Sughrue Mion, PLLC

(57) ABSTRACT

An apparatus for diagnosing malfunctioning which is applied to an internal combustion engine having a catalyst, an air-fuel ratio sensor, and an oxygen sensor is disclosed. The apparatus diagnoses whether the oxygen sensor is malfunctioning on the basis of a change in an output value of the oxygen sensor within a predetermined period of time after the output value has started changing towards a lean side after the start of fuel cutoff. The apparatus is provided with a first determination section and a second determination section. The first determination section determines whether fresh air has reached the air-fuel ratio sensor after the start of the fuel cutoff. The second determination section determines whether or not to carry out diagnosis of malfunctioning on the basis of the output value of the oxygen sensor immediately after the first determination section has determined that fresh air has reached the air-fuel ratio sensor.

17 Claims, 9 Drawing Sheets

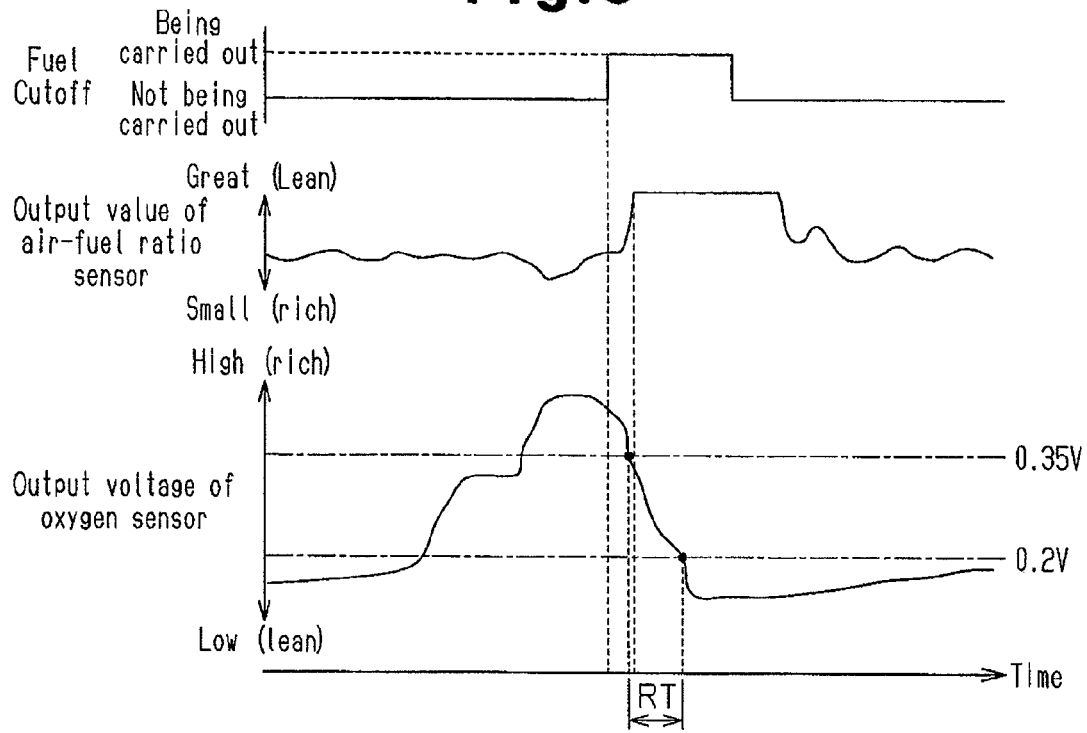
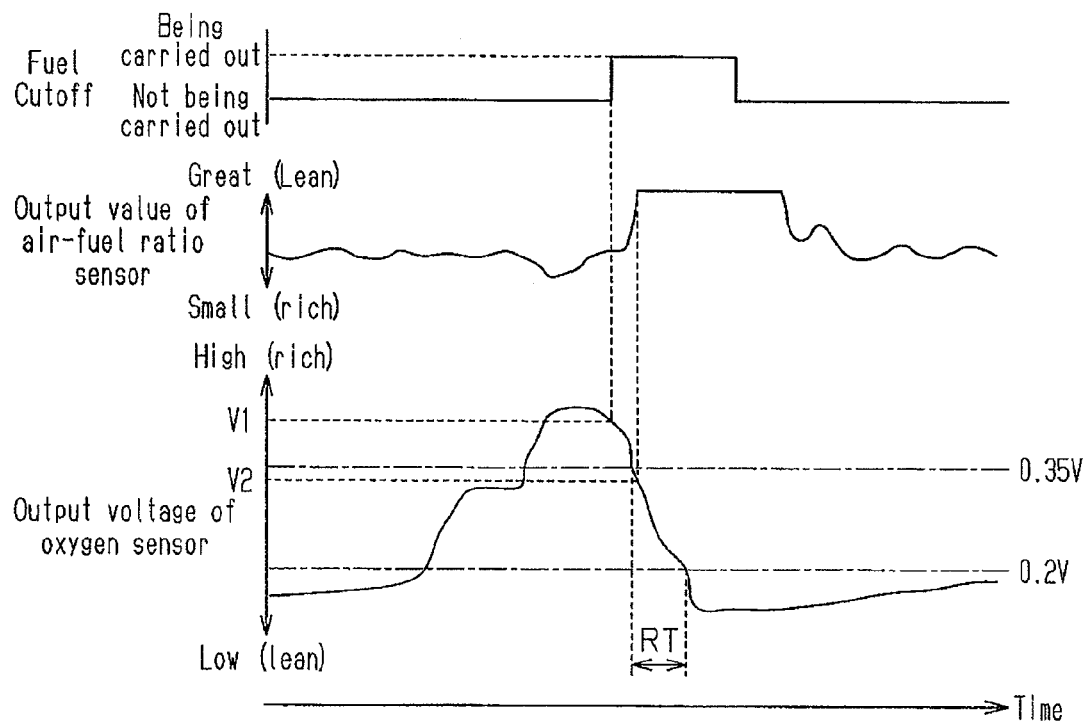

APPARATUS FOR DIAGNOSING MALFUNCTIONING OF OXYGEN SENSOR

BACKGROUND OF THE INVENTION

The present invention relates to an apparatus for diagnosing malfunctioning in an oxygen concentration sensor which is provided downstream from a catalyst in the exhaust passage of an internal combustion engine.

In internal combustion engines, exhaust components are purified by a catalyst for purifying exhaust, which is provided in the exhaust passage. This purification of the exhaust components by the catalyst is carried out efficiently in the case where the air-fuel ratio of the air-fuel mixture, which is burned in the internal combustion engine, is within a predetermined range. Therefore, an air-fuel ratio feedback control is generally carried out such that an oxygen concentration sensor for detecting the concentration of oxygen in the exhaust is provided in a section of the exhaust passage on the upstream side of the catalyst, the air-fuel ratio of the air-fuel mixture is detected on the basis of an output signal of this sensor, and the correction value of the air-fuel ratio relative to the amount of fuel injection is determined so that this detected air-fuel ratio becomes the target air-fuel ratio, and thus, the amount of fuel injection is increased or decreased.

In addition, to obtain the state of the exhaust components purified by the catalyst, a "sub-feedback control" of the air-fuel ratio is also carried out in which an oxygen concentration sensor (downstream oxygen concentration sensor) is provided in a section of the exhaust passage on the downstream side of the catalyst, the air-fuel ratio of the exhaust after it has passed through the catalyst is detected on the basis of an output signal of this sensor, and a modification value relative to the above described correction value of the air-fuel ratio is calculated.

In the above described sub-feedback control, the output value of the downstream oxygen concentration sensor is used, and therefore, in the case where malfunctioning occurs in this oxygen concentration sensor, normal control cannot be maintained, which in turn leads to a risk that the exhaust may not be sufficiently purified. Therefore, during fuel cutoff, in which fresh air is introduced into the exhaust passage when fuel injection from the fuel injection valve is stopped, diagnosis of malfunctioning is carried out in which the downstream oxygen concentration sensor detects fresh air after the start of the fuel cutoff, and thus, the period until the output value of this indicates a lean air-fuel ratio is measured, and malfunctioning of the downstream oxygen concentration sensor is diagnosed on the basis of the thus measured time.

The catalyst provided in a section of the exhaust passage on the upstream side of the downstream oxygen concentration sensor has an oxygen storing function in so that it stores and releases oxygen. Therefore, when malfunctioning is diagnosed in the downstream oxygen concentration sensor on the basis of the period from the start of the fuel cutoff until the output value of the downstream oxygen concentration sensor indicates that the air-fuel ratio is lean, this period fluctuates when affected by the oxygen storing function, and thus, the accuracy in detecting malfunctioning decreases.

In order to prevent the detecting accuracy from decreasing due to this oxygen storing function, in the apparatus described in, for example, Japanese Laid-Open Patent Publication No. 2003-343339, malfunctioning is diagnosed in the downstream oxygen concentration sensor on the basis of a change in the output value within a predetermined period of time after fuel cutoff has been carried out and the output value of the downstream oxygen concentration sensor has actually started changing towards a side representing lean air-fuel ratio (lean side). According to this diagnosis of malfunctioning, malfunctioning can be diagnosed on the basis of only the responsiveness of the downstream oxygen concentration sensor.

Incidentally, the output value of the downstream oxygen concentration sensor sometimes gradually changes towards the lean side due to the oxygen storing function of the catalyst even before fresh air reaches the downstream oxygen concentration sensor.

Therefore, as described in Japanese Laid-Open Patent Publication No. 2003-343339, it is determined that the responsiveness of the downstream oxygen concentration sensor is low in the case where malfunctioning is diagnosed in the downstream oxygen concentration sensor on the basis of a change in the output value within a predetermined period of time after the output value of the downstream oxygen concentration sensor has started changing towards the lean side and when a change in the output value occurs as described above before the above described fresh air arrives at the downstream oxygen concentration sensor. As a result, the downstream oxygen concentration sensor may be erroneously determined to be malfunctioning.

SUMMARY OF THE INVENTION

Accordingly, it is an objective of the present invention to provide an apparatus for diagnosing malfunctioning in an oxygen concentration sensor, which sensor minimizes the possibility of erroneous determination due to the oxygen storing function of a catalyst when diagnosing malfunctioning in the oxygen concentration sensor which is provided in a section of the exhaust passage on the downstream side of the catalyst.

In order to achieve the above described objective and in accordance with one aspect of the present invention, an apparatus for diagnosing malfunctioning is provided. The apparatus is applied to an internal combustion engine having a catalyst provided in an exhaust passage for purifying exhaust, an upstream oxygen concentration sensor provided in a section of the exhaust passage on the upstream side of the catalyst, and a downstream oxygen concentration sensor provided in a section of the exhaust passage on the downstream side of the catalyst. The apparatus diagnoses whether a downstream oxygen concentration sensor is malfunctioning on the basis of a change in an output value of the downstream oxygen concentration sensor within a predetermined period of time after the output value has started changing toward a lean side after the start of fuel cutoff. The apparatus includes a first determination section and a second determination section. The first determination section determines whether fresh air has reached the upstream oxygen concentration sensor after the start of the fuel cutoff. The second determination section determines whether or not to carry out the diagnosis of malfunctioning on the basis of the output value of the downstream oxygen concentration sensor immediately after the first determination section determines that fresh air has reached the upstream oxygen concentration sensor.

In accordance with a second aspect of the present invention, an apparatus for diagnosing malfunctioning is provided. The apparatus is applied to an internal combustion engine having a catalyst provided in an exhaust passage for purifying exhaust, an upstream oxygen concentration sensor provided in a section of the exhaust passage on the upstream side of the catalyst, and a downstream oxygen concentration sensor provided in a section of the exhaust passage on the downstream side of the catalyst. The apparatus diagnoses whether a downstream oxygen concentration sensor is malfunctioning on the basis of a change in an output value of the downstream oxygen concentration sensor within a predetermined period of time after the output value has started changing toward a lean side after the start of fuel cutoff. The apparatus includes a first determination section and a second determination section. The first determination section determines whether fresh air has reached the upstream oxygen concentration sensor after the start of the fuel cutoff. The second determination section determines whether or not to carry out the diagnosis of malfunctioning on the basis of a first output value, which is an output value of the downstream oxygen concentration sensor immediately after the start of the fuel cutoff, and a second output value, which is an output value of the downstream oxygen concentration sensor immediately after the first determination section has determined that fresh air has reached the upstream oxygen concentration sensor.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a timing chart showing the manner in which the output values of the air-fuel ratio sensor and the oxygen sensor change after fuel cutoff has been carried out in the case where the output value of the oxygen sensor is affected by the oxygen storing function of a catalyst;

FIG. 4 is a timing chart showing the timing according to which the oxygen sensor according to the first embodiment stores a first output voltage and a second output voltage;

DETAILED DESCRIPTION OF THE PREFERRED EMBODIMENTS

In the following, an apparatus for diagnosing malfunctioning in an oxygen sensor according to a first embodiment of the present invention is described with reference to FIGS. 1 to 8.

Figure 1:
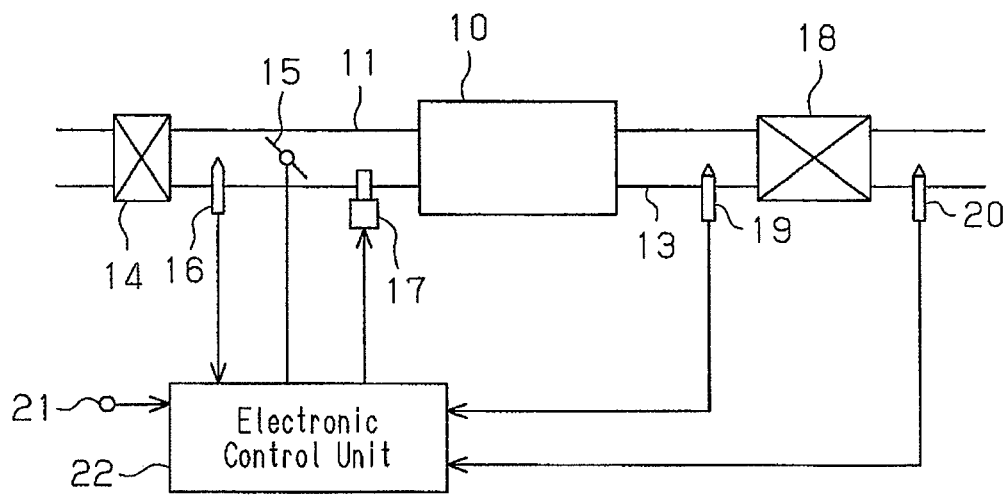
FIG. 1 is a schematic diagram showing the configuration of an internal combustion engine and its periphery to which the apparatus for diagnosing malfunctioning according to a first embodiment of the present invention is applied.

As shown in FIG. 1, a throttle valve 15 for varying the area of the passage is provided in the intake passage 11 of an internal combustion engine 10, and the amount of air which is taken in through an air cleaner 14 is adjusted through the control of the degree of the opening of the throttle valve 15. In addition, the intake air amount is detected by a hot-wire air flowmeter 16. The air that has been taken into the intake passage 11 is mixed with fuel that has been injected from an injector 17 provided downstream from the throttle valve 15, and after that, the mixture is sent to the combustion chamber of the internal combustion engine 10 and burned.

A catalyst 18 for purifying exhaust is provided in the exhaust passage 13, to which the exhaust resulting from combustion in the combustion chamber is sent, in order to purify the components in the exhaust. The catalyst 18 has the effect of purifying the exhaust by oxidizing HC and CO in the exhaust and reducing NOx in the exhaust in the state where combustion progresses in the vicinity of the stoichiometric air-fuel ratio. The catalyst 18 has an oxygen storing function. That is, the catalyst 18 stores oxygen in the exhaust when the air-fuel ratio in the exhaust which passes through the catalyst 18 is leaner than the stoichiometric air-fuel ratio, and releases oxygen that has been stored when the air-fuel ratio is richer than the stoichiometric air-fuel ratio.

An air-fuel ratio sensor 19 is provided in a section of the exhaust passage 13 on the upstream side of the catalyst 18. In addition, an oxygen sensor 20 is provided in a section of the exhaust passage 13 on the downstream side of the catalyst 18. According to the present embodiment, the air-fuel ratio sensor 19 forms an upstream oxygen concentration sensor and the oxygen sensor 20 forms a downstream oxygen concentration sensor.

The air-fuel ratio sensor 19 is a publicly known limiting current type oxygen sensor. The limiting current type oxygen sensor is provided with a ceramic layer, referred to as diffusion controlling layer, in a detection section of a concentration cell type oxygen sensor, and outputs a current in accordance with the concentration of oxygen in the exhaust. In the case where the air-fuel ratio, which is closely related to the concentration of oxygen in the exhaust, is the stoichiometric air-fuel ratio, the output value (output current) becomes zero. In addition, as the air-fuel ratio becomes richer, the output value becomes greater in the negative direction, while as the air-ratio becomes leaner, the output value becomes greater in the positive direction. Accordingly, the leanness or richness of the air-fuel ratio can be detected in the section of the exhaust passage 13 on the upstream side of the catalyst 18 on the basis of this output value of the air-fuel ratio sensor 19.

In addition, the oxygen sensor 20 is a publicly known concentration cell type oxygen sensor. The concentration cell type oxygen sensor outputs a voltage of approximately 1 V when the air-fuel ratio is richer than the stoichiometric air-fuel ratio, and outputs a voltage of approximately 0 V when the output air-fuel ratio is leaner than the stoichiometric air-fuel ratio. In addition, the output voltage greatly changes in the vicinity of the stoichiometric air-fuel ratio. Accordingly, the leanness or richness of the air-fuel ratio can be detected in the section of the exhaust passage 13 on the downstream side of the catalyst 18 on the basis of the output voltage of this oxygen sensor 20. According to the present embodiment, in the case where the output voltage of the oxygen sensor 20 is 0.45 V or higher, the air-fuel ratio is determined to be "rich," while in the case where the output voltage is less than 0.45 V, the air-fuel ratio is determined to be "lean." In addition, this oxygen sensor 20 is provided in the section of the exhaust passage 13 on the downstream side of the catalyst 18, so that the state of the effect of purifying the exhaust in the catalyst 18 can be monitored. That is to say, when the output of the air-fuel ratio sensor 19 indicates a rich air-fuel ratio and the output of the oxygen sensor 20 indicates a lean air-fuel ratio, oxygen is released from the catalyst 18, and it is recognized that the oxidation process is promoted in the catalyst 18. Meanwhile, when the output of the air-fuel ratio sensor 19 indicates a lean air-fuel ratio and the output of the oxygen sensor 20 indicates a rich air-fuel ratio, oxygen is stored in the catalyst 18, and it is recognized that the reduction process is promoted in the catalyst 18.

The above described catalyst 18 efficiently purifies all of the main harmful components (HC, CO, NOx) in the exhaust through oxidation-reduction reaction only when the air-fuel ratio of the air-fuel mixture to be burned is in a narrow range (window) in the vicinity of the stoichiometric air-fuel ratio. A strict air-fuel ratio control where the air-fuel ratio of the air-fuel mixture is adjusted to the center of the above described window becomes necessary to make the catalyst 18 functions effectively.

This control of the air-fuel ratio is carried out by an electronic control unit 22. Detection signals of various types of sensors, including the above described air flowmeter 16, the above described air-fuel ratio sensor 19, the oxygen sensor 20, an accelerator pedal sensor for detecting the degree to which the accelerator pedal is pressed down, and a rotational speed sensor 21 for detecting the engine speed NE, are inputted into the electronic control unit 22. The electronic control unit 22 drives and controls the above described throttle valve 15, the injector 17 and the like in accordance with the state of operation of the internal combustion engine 10 and the vehicle, which are recognized through the detection signals of these sensors, and controls the air-fuel ratio as described above. Next, the outline of this air-fuel ratio control by the electronic control unit 22 is described.

First, the electronic control unit 22 determines a requested amount of intake air amount, which is obtained in accordance with the results of detection of the above described degree to which the accelerator pedal is being pressed down and the rotational speed of the engine, and adjusts the degree of opening of the throttle valve 15 so that the intake air amount can be gained in accordance with the requested amount. Meanwhile, the amount of fuel injection which allows the stoichiometric air-fuel ratio to be gained is determined for the measured value of the intake air amount, which is detected by the air flowmeter 16, and the injector 17 is adjusted so as to inject this fuel injection amount. As a result of this air-fuel ratio control, the air-fuel ratio of the air-fuel mixture which is burned in the combustion chamber can be made close to the stoichiometric air-fuel ratio to a certain degree. However, only air-fuel ratio control as that described above is insufficient for the air-fuel ratio control with the high accuracy required in the above.

Therefore, the electronic control unit 22 obtains a measured value of the air-fuel ratio in the section of the exhaust passage on the upstream side of the catalyst 18 from the results of detection by the above described air-fuel ratio sensor 19, and carries out feedback correction on the fuel injection amount of the injector 17 on the basis of the amount of feedback correction of the air-fuel ratio, which is calculated on the basis of the degree of difference between the above described measured value and the target air-fuel ratio, that is, the stoichiometric air-fuel ratio. The accuracy of the required air-fuel ratio control is ensured by carrying out this air-fuel ratio feedback control.

In addition, the electronic control unit 22 estimates the state of the catalyst 18 that has stored oxygen or the state of the catalyst 18 that has released oxygen from the results of detection by the above described oxygen sensor 20, and alters the above described air-fuel ratio feedback correction amount on the basis of this estimation. In this alteration process, a sub-feedback correction amount SFB, which is calculated on the basis of the output of the oxygen sensor 20, is increased or decreased and corrected, and thus, the above described air-fuel ratio feedback correction amount is altered by the sub-feedback correction amount SFB. Specifically, when the output of the oxygen sensor 20 indicates a rich air-fuel ratio, the sub-feedback correction amount SFB is increased to the negative side by certain increments so that the air-fuel ratio in the section of the exhaust passage 13 on the upstream side of the catalyst 18 becomes leaner by certain increments, that is, the air-fuel ratio in the section of the exhaust passage 13 on the upstream side of the catalyst 18 gradually becomes leaner. Meanwhile, when the output of the oxygen sensor 20 indicates a lean air-fuel ratio, the sub-feedback correction amount SFB is increased to the positive side by certain increments so that the air-fuel ratio in the section of the exhaust passage 13 on the upstream side of the catalyst 18 changes to a richer value by certain increments, that is, the air-fuel ratio on the upstream side of the catalyst 18 gradually becomes richer. The effect of purification of the catalyst 18 is effectively used through this sub-feedback control.

When the oxygen sensor 20 is malfunctioning, the output signal does not reflect the air-fuel ratio of the actual exhaust, and thus, the above described sub-feedback control cannot be carried out with precision. Furthermore, there is a risk that the alteration of the air-fuel ratio feedback correction amount through the sub-feedback correction amount SFB may be negatively affected.

Therefore, according to the present embodiment, whether the oxygen sensor 20 is malfunctioning is diagnosed as follows.

Figure 2:
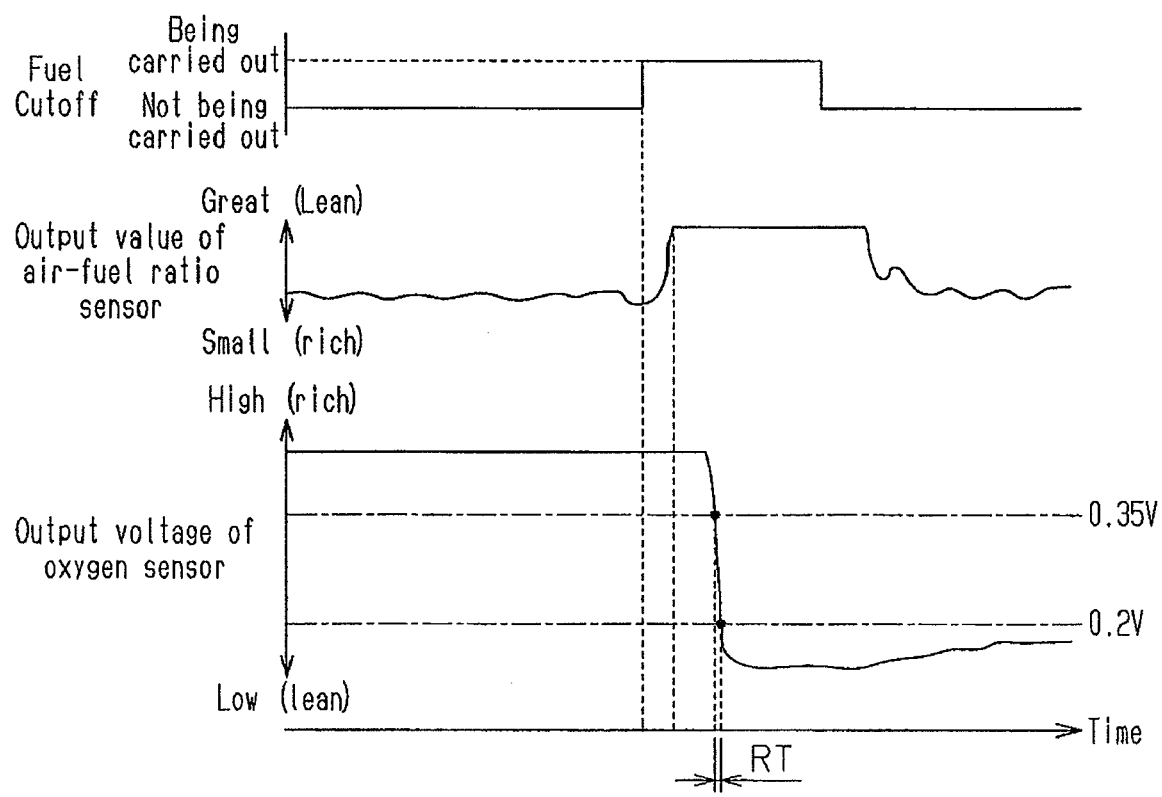
FIG. 2 is a timing chart showing the manner in which output values of the air-fuel ratio sensor and the oxygen sensor change after fuel cutoff according to the first embodiment has been carried out.

As shown in FIG. 2, stopping of fuel injection from the injector 17, which is called fuel cutoff, is carried out in the internal combustion engine 10 when the speed of the vehicle is reduced. When the fuel cutoff is carried out, fresh air is introduced into the exhaust passage 13, and when the fresh air reaches the air-fuel ratio sensor 19, the output value of the air-fuel ratio sensor 19 indicates a lean air-fuel ratio. Then, after the fresh air reaches the air-fuel ratio sensor 19, the output voltage of the oxygen sensor 20 changes from a value indicating a rich air-fuel ratio to a value indicating a lean air-fuel ratio (from a value on a rich side to a value on a lean side). Malfunctioning in the oxygen sensor 20 is diagnosed on the basis of the change in the output value within a predetermined period of time after the fuel cutoff has been carried out as described above and the output value of the oxygen sensor 20 actually starts becoming leaner. More specifically, the response time RT required for the output voltage V of the oxygen sensor 20 to lower from a first value (for example "0.35 V") indicating a lean air fuel ratio to a second value (for example "0.2 V") indicating a leaner air fuel ratio is measured by the electronic control unit 22. Then, in the case where the measured response time RT is the malfunctioning determining value E or higher, the responsiveness of the oxygen sensor 20 lowers, and it is determined that the oxygen sensor 20 is malfunctioning.

Incidentally, as shown in FIG. 3, even before the fresh air coming in as a result of fuel cutoff reaches the oxygen sensor 20, the output voltage V of the oxygen sensor 20 in some cases gradually changes towards the lean side as a result of the oxygen storing function of the catalyst 18.

In the case where the output voltage V gradually changes towards the lean side before the fresh air reaches the oxygen sensor 20 as described above, the above described response time RT becomes long, even in the case where the oxygen sensor 20 is functioning properly. In the case where the response time RT is the above described malfunctioning determining value E or higher, it is determined that the responsiveness of the oxygen sensor 20 is low, and it is erroneously determined that the oxygen sensor 20 is malfunctioning.

In the case where the above described response time RT is long when the oxygen storing function of the catalyst 18 affects the output voltage V of the oxygen sensor 20 which changes towards the lean side after the start of the fuel cutoff in this manner, it is possible to prevent the above described erroneous determination by stopping the diagnosis of malfunctioning in the oxygen sensor 20.

Therefore, the present inventor investigated what parameters would make it possible to appropriately detect the state where the response time RT becomes long as a result of the oxygen storing function. As a result, as shown in FIG. 4, the inventor found out that the first output voltage V1, which is the output voltage of the oxygen sensor 20 immediately after the start of the fuel cutoff, in other words, immediately after fuel injection from the injector 17 is stopped, and the second output voltage V2, which is the output voltage of the oxygen sensor 20 immediately after fresh air has reached the air-fuel ratio sensor 19, could be these parameters. More specifically, the inventor found out that it is possible to detect a state where the above described response time RT becomes long on the basis of the output difference ΔV, which is the difference between the first output voltage V1 and the second output voltage V2, or the value of the second output voltage V2.

Figure 5:
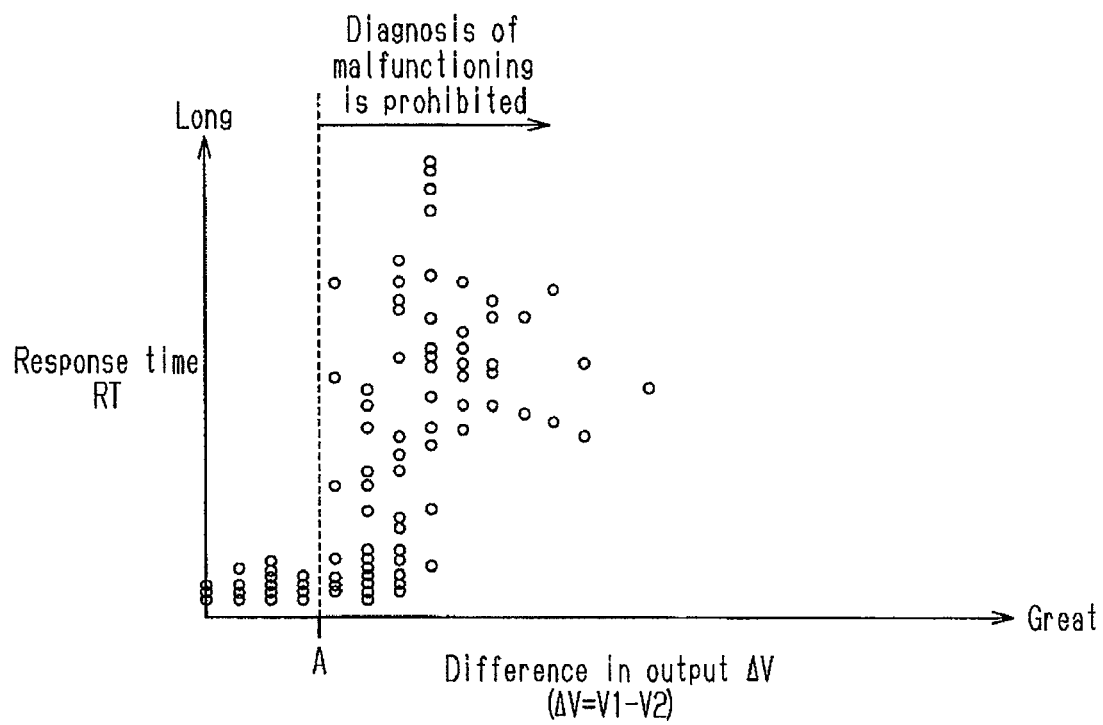
FIG. 5 is a plotted graph showing the relationship between a response time and the difference in the output between the first output voltage and the second output voltage.
Figure 6:
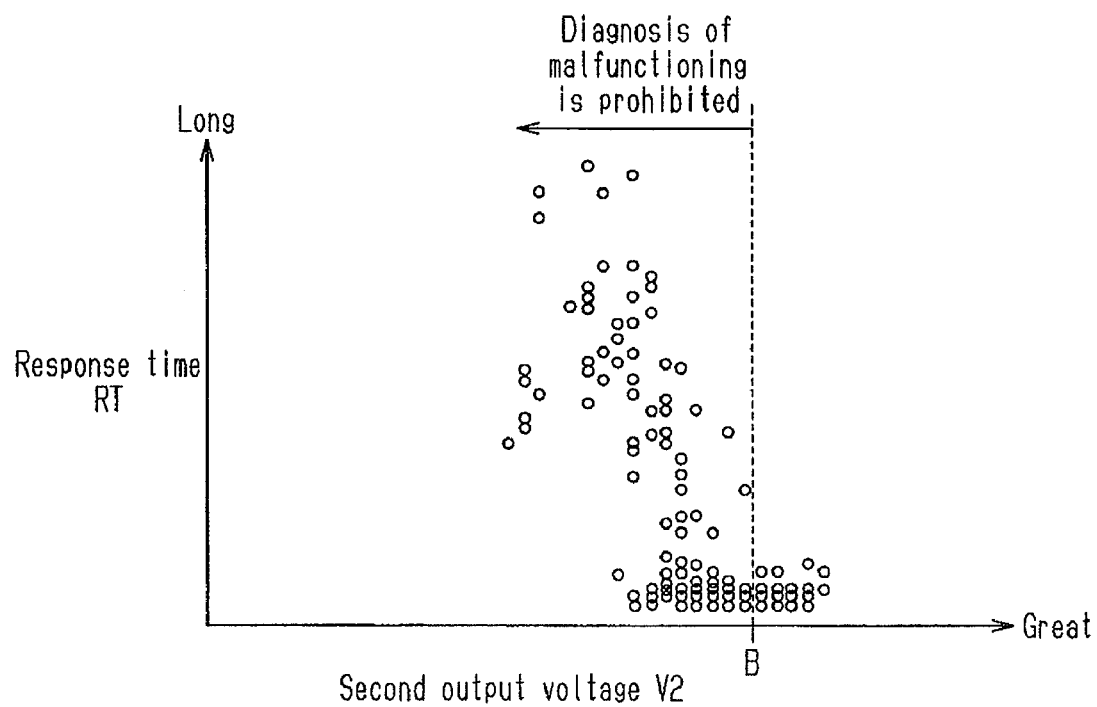
FIG. 6 is a plotted graph showing the relationship between the second output voltage and the response time.

FIGS. 5 and 6 show the results of experiment at the time of this inspection. FIG. 5 shows the relationship between the output difference ΔV and the response time RT, and FIG. 6 shows the relationship between the value of the second output voltage V2 and the response time RT.

It was found out, as shown in FIG. 5, that the greater the output difference ΔV between the first output voltage V1 and the second output voltage V2 is, the longer the response time RT tends to be, and the higher the possibility of the oxygen storing function of the catalyst 18 affecting the output voltage V of the oxygen sensor 20 becomes.

In addition, it was found out, as shown in FIG. 6, that the lower the second output voltage V2 is, the longer the response time RT tends to be, and the higher the possibility of the oxygen storing function of the catalyst 18 affecting the output voltage V of the oxygen sensor 20 becomes.

Therefore, according to the first embodiment, as shown in FIG. 5, a determination value A, with which it can be determined that the possibility of the oxygen storing function of the catalyst 18 affecting the output voltage V of the oxygen sensor 20 is high, is set for the output difference ΔV, and in the case where the output difference ΔV is this determination value A or higher, the diagnosis of malfunctioning in the oxygen sensor 20 is stopped.

In addition, as shown in FIG. 6, a determination value B, with which it can be determined that the possibility of the oxygen storing function of the catalyst 18 affecting the output voltage V of the oxygen sensor 20 is high, is set for the second output voltage V2, and in the case where the second output voltage V2 is the determination value B or lower also, the diagnosis of malfunctioning in the oxygen sensor 20 is stopped.

Figure 7:
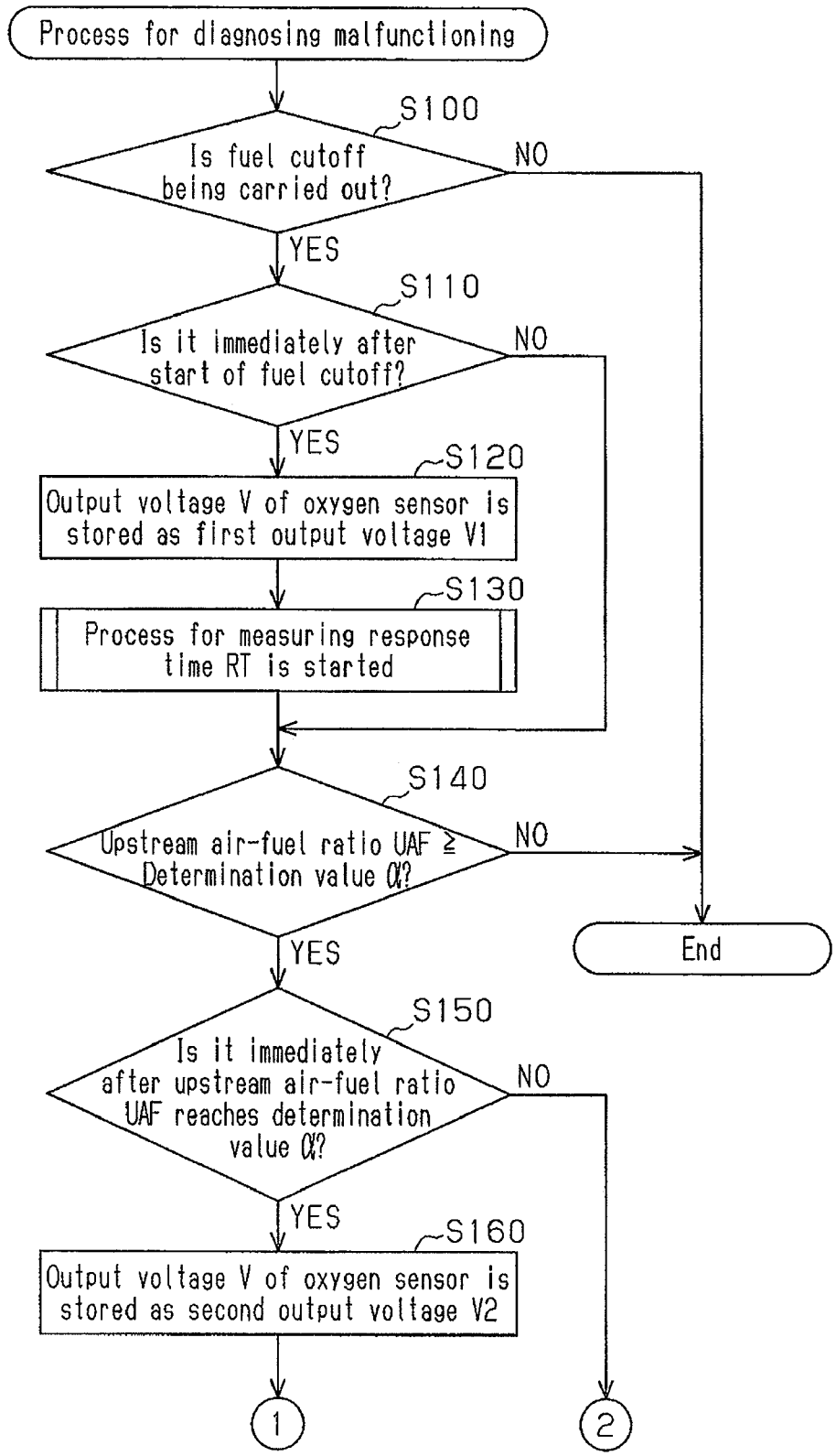
FIG. 7 is a flowchart showing a procedure of the process for diagnosing malfunctioning in the oxygen sensor according to the first embodiment.

In the following, the procedure of the process for diagnosing malfunctioning of the oxygen sensor 20 according to the present embodiment is described with reference to FIGS. 7 and 8. The electronic control unit 22 repeatedly carries out the present process at a predetermined period.

When the present process is started, first, whether the fuel cutoff is being carried out in the current determination cycle is determined in step S100. In the case where it is determined that the fuel cutoff is not being carried out in the current determination cycle in step S100, the present process is suspended.

Meanwhile, in the case where it is determined that the fuel cutoff is being carried out in step S100, the electronic control unit 22 proceeds to step S110, and determines whether the current determination cycle is immediately after the start of the fuel cutoff. In the case where it is determined that the current determination cycle is immediately after the start of the fuel cutoff in step S110, the electronic control unit 22 proceeds to step S120 and stores the output voltage V of the oxygen sensor 20 immediately after the start of the fuel cutoff in the memory of the electronic control unit 22 as the above described first output voltage V1. Then, in step S130, the electronic control unit 22 starts the process for measuring the above described response time RT. In this process for measuring the response time RT, the time for the output voltage V to change from "0.35 V" to "0.2 V" is measured in the process during which the output of the oxygen sensor 20 changes towards the lean side.

Thus, in the case where it is determined that the current determination cycle is not immediately after the start of the fuel cutoff after step S130 is started or in step S110, the electronic control unit 22 proceeds to step S140.

In step S140, whether the upstream air-fuel ratio UAF which is detected by the air-fuel ratio sensor 19 is the determination value α or higher is determined. This determination value α is a value for determining whether it is indicated that the upstream air-fuel ratio UAF is lean, and set to "16" in the present embodiment, but may be changed to any appropriate value. Then, in the case where it is determined that he upstream air-fuel ratio UAF is less than the determination value α in step S140, it is determined that fresh air coming as a result of the fuel cutoff has not yet reached the air-fuel ratio sensor 19, and the present process is suspended.

Meanwhile, in the case where the upstream air-fuel ratio UAF is the determination value α or higher, it is determined that the fresh air coming in as a result of the fuel cutoff has reached the air-fuel ratio sensor 19, and the electronic control unit 22 proceeds to step S150. In step S150, whether this is immediately after the upstream air-fuel ratio UAF has reached the determination value α. The determination is negative in step 140 when the present process is carried out in the previous determination cycle, and in the case where the determination is affirmative for the first time in step S140 in the determination cycle of this time, it is determined that it is immediately after the upstream air fuel ratio UAF has reached the determination value α. According to the first embodiment, the processes in these steps S140 and S150 correspond to the processes carried out by a first determination section.

In the case where it is determined that it is immediately after the fresh air coming in as a result of the fuel cutoff has reached the air-fuel ratio sensor 19 in step S150, the electronic control unit 22 proceeds to step S160. In step S160, the output voltage V of the oxygen sensor 20 immediately after the fresh air has reached the air-fuel ratio sensor 19 is stored in the memory of the electronic control unit 22 as the above described second output voltage V2.

Next, in step S170, the above described output difference ΔV is calculated by subtracting the second output voltage V2 from the first output voltage V1, and it is determined whether this output difference ΔV is the above descried determination value A or higher. In the case where it is determined that the output difference ΔV is the above described determination value A or higher in step S170, there is a possibility that the response time RT may become long as a result of the oxygen storing function of the catalyst 18, and thus, there is a possibility that the oxygen sensor 20 may be erroneously diagnosed as malfunctioning. Therefore, the electronic control unit 22 proceeds to step S180 and stops the process for measuring the response time RT, and proceeds further to step S185. In step S185, the electronic control unit 22 prohibits diagnosis of malfunctioning of the oxygen sensor 20, and the present process is suspended.

Meanwhile, in the above described step S170, in the case where the output difference ΔV is less than the above described determination value A, there is no possibility of the response time RT becoming long as a result of the oxygen storing function of the catalyst 18, and in order to appropriately determine this possibility, the electronic control unit 22 proceeds to step S190 and determines that the second output voltage V2 is the above described determination value B or lower. In step S190, in the case where it is determined that the second output voltage V2 is the above described determination value B or lower, there is a possibility that the response time RT may become long as a result of the oxygen storing function of the catalyst 18, and thus, there is a possibility of the oxygen sensor 20 being erroneously diagnosed as malfunctioning. Therefore, the electronic control unit 22 proceeds to step S180 and stops the process for measuring the response time RT and proceeds further to step S185. In step S185, the electronic control unit 22 prohibits diagnosis of malfunctioning of the oxygen sensor 20, and the present process is suspended. According to the first embodiment, the processes in steps S170 and S190 correspond to the processes carried out by a second determination section.

In step S190, in the case where it is determined that the second output voltage V2 exceeds the above described determination value B, the possibility of the response time RT becoming long as a result of the oxygen storing function of the catalyst 18 is negative. In this case, step S200 and the subsequent steps shown in FIG. 8 are carried out, and thus, diagnosis of malfunctioning of the oxygen sensor 20 is carried out. In addition, in the case where the determination is negative in step S150, as shown in the previous FIG. 7, that is, in the case where fresh air has already reached the air-fuel ratio sensor 19 and the possibility of the response time RT becoming long is already negative in the previous determination cycle or before, step S200 and the subsequent steps shown in FIG. 8 are carried out, and thus, diagnosis of malfunctioning of the oxygen sensor 20 is carried out.

In step S200, whether the measurement of the above described response time RT is completed, that is, the measurement of the time required for the output voltage V of the oxygen sensor 20 to change from "0.35 V" to "0.2 V" is completed, is determined. In the case where the measurement of the response time RT is not completed in step S200, the present process is suspended, after which the measurement of the response time RT continues.

In the case where it is determined that the measurement of the response time RT is completed in step S200, the electronic control unit 22 proceeds to step S210, and it is determined whether the response time RT is the above described malfunctioning determination value E or higher. In the case where the response time RT is the malfunctioning determination value E or higher in step S210, the electronic control unit 22 proceeds to step S230, and it is determined that the oxygen sensor 20 is malfunctioning, and the present process is suspended.

In the case where it is determined that the response time RT is less than the malfunctioning determination value E in step S210, the electronic control unit 22 proceeds to step S220, and determines that the oxygen sensor 20 is functioning properly, and the present process is suspended.

The above described present embodiment has the following advantages.

(1) The present inventor found out that whether the output voltage of the oxygen sensor 20 which changes towards the lean side after the start of the fuel cutoff is affected by the oxygen storing function of the catalyst 18 is determined by referring to the output voltage of the oxygen sensor 20 immediately after fresh air has reached the air-fuel ratio sensor 19 provided in the exhaust passage 13 on the upstream side of the catalyst 18 after the start of the fuel cutoff. Thus, according to the present embodiment, whether fresh air has reached the air-fuel ratio sensor 19 after the start of the fuel cutoff is determined, and whether or not to carry out diagnosis of malfunctioning of the oxygen sensor 20 is determined on the basis of the second output voltage V2, which is the output voltage of the oxygen sensor 20 immediately after it is determined that fresh air has reached the air-fuel ratio sensor 19. Therefore, when it is determined that the output voltage V of the oxygen sensor 20 is affected by the oxygen storing function of the catalyst 18, it becomes possible to prohibit diagnosis of malfunctioning. As a result, when malfunctioning of the oxygen sensor 20 is diagnosed, errors in determination are reduced a great deal, due to the oxygen storing function of the catalyst 18.

(2) The present inventor found out that the lower the above described second output voltage V2 is, the higher the possibility of the oxygen storing function of the catalyst 18 affecting the output voltage of the oxygen sensor 20 becomes. Thus, according to the present embodiment, when the output voltage (second output voltage V2) of the oxygen sensor 20 immediately after it is determined that fresh air has reached the air-fuel ratio sensor 19 after the start of the fuel cutoff is the determination value B or lower, the measurement of the response time RT is stopped and diagnosis of malfunctioning of the oxygen sensor 20 is prohibited. Therefore, whether diagnosis of malfunctioning of the oxygen sensor 20 is carried out is appropriately determined.

(3) The present inventor also found out that whether the oxygen storing function of the catalyst 18 affects the output voltage of the oxygen sensor 20 which changes towards the lean side after the start of the fuel cutoff can be determined on the basis of the output voltage of the oxygen sensor 20 immediately after the start of the fuel cutoff and the output voltage of the oxygen sensor 20 immediately after fresh air has reached the air-fuel ratio sensor 19. Thus, according to the present embodiment, whether fresh air has reached the air-fuel ratio sensor 19 is determined after the start of the fuel cutoff. Then, whether or not to carry out diagnosis of malfunctioning of the oxygen sensor 20 is determined on the basis of the second output voltage V2, which is the output value of the oxygen sensor 20 immediately after it is determined that fresh air has reached the air-fuel ratio sensor 19, and the first output voltage V1, which is the output voltage of the oxygen sensor 20 immediately after the start of the fuel cutoff. Therefore, when it is determined that the oxygen storing function of the catalyst 18 affects the output voltage V of the oxygen sensor 20, it becomes possible to prohibit diagnosis of malfunctioning. As a result, when malfunctioning of the oxygen sensor 20 is diagnosed, errors in determination are reduced a great deal, due to the oxygen storing function of the catalyst 18.

(4) The present inventor found out that the greater the difference between the above described first output value and the above described second output value is, the higher the possibility of the oxygen storing function of the catalyst affecting the output value of the downstream oxygen concentration sensor becomes. Thus, according to the present embodiment, when the output difference $\Delta V$, which is the difference between the first output voltage and the second output voltage V2, is the determination value A or higher, the measurement of the response time RT is stopped, and diagnosis of malfunctioning of the oxygen sensor 20 is prohibited. Therefore, whether diagnosis of malfunctioning of the oxygen sensor 20 is carried out is appropriately determined.

(5) As described above, the lower the above described second output voltage V2 is, or the greater the above described output difference $\Delta V$ is, the higher the possibility of the oxygen storing function of the catalyst 18 affecting the output voltage of the oxygen sensor 20 becomes. According to the present embodiment, even in the case where the output difference $\Delta V$ is less than the above described determination value A, which is small, to a certain degree, and diagnosis of malfunctioning is allowed as a result of the determination as to whether diagnosis of malfunctioning can be carried out, on the basis of this output difference $\Delta V$, diagnosis of malfunctioning is prohibited when the second output voltage V2 is the above described determination value B or less, and small, to a certain degree. When it is determined whether diagnosis of malfunctioning of the oxygen sensor 20 can be carried out as described above, double determination is carried out to reliably determining whether diagnosis of malfunctioning can be carried.

(6) When the output value of the air-fuel ratio sensor 19 indicates a lean air-fuel ratio, it is determined that fresh air has reached the air-fuel ratio sensor 19. Therefore, it is appropriately determined whether fresh air has reached the air-fuel ratio sensor 19 after the start of the fuel cutoff.

Next, an apparatus for diagnosing malfunctioning of the oxygen sensor according to a second embodiment of this invention is described with reference to FIG. 9.

According to the first embodiment, whether fresh air has reached the air-fuel ratio sensor 19 is determined on the basis of the output value of the air-fuel ratio sensor 19, and in the case where this air-fuel ratio sensor 19 is malfunctioning, there is a risk that the arrival of fresh air at the air-fuel ratio sensor 19 may not be appropriately determined. It is possible to determine whether fresh air has reached the air-fuel ratio sensor 19 on the basis of the total intake air amount that flows into the exhaust passage 13 after the start of the fuel cutoff. Therefore, according to the second embodiment, whether fresh air has reached the air-fuel ratio sensor 19 is determined on the basis of the above described accumulated air amount when the process for diagnosis of malfunctioning is carried out for the oxygen sensor 20.

Figure 9:
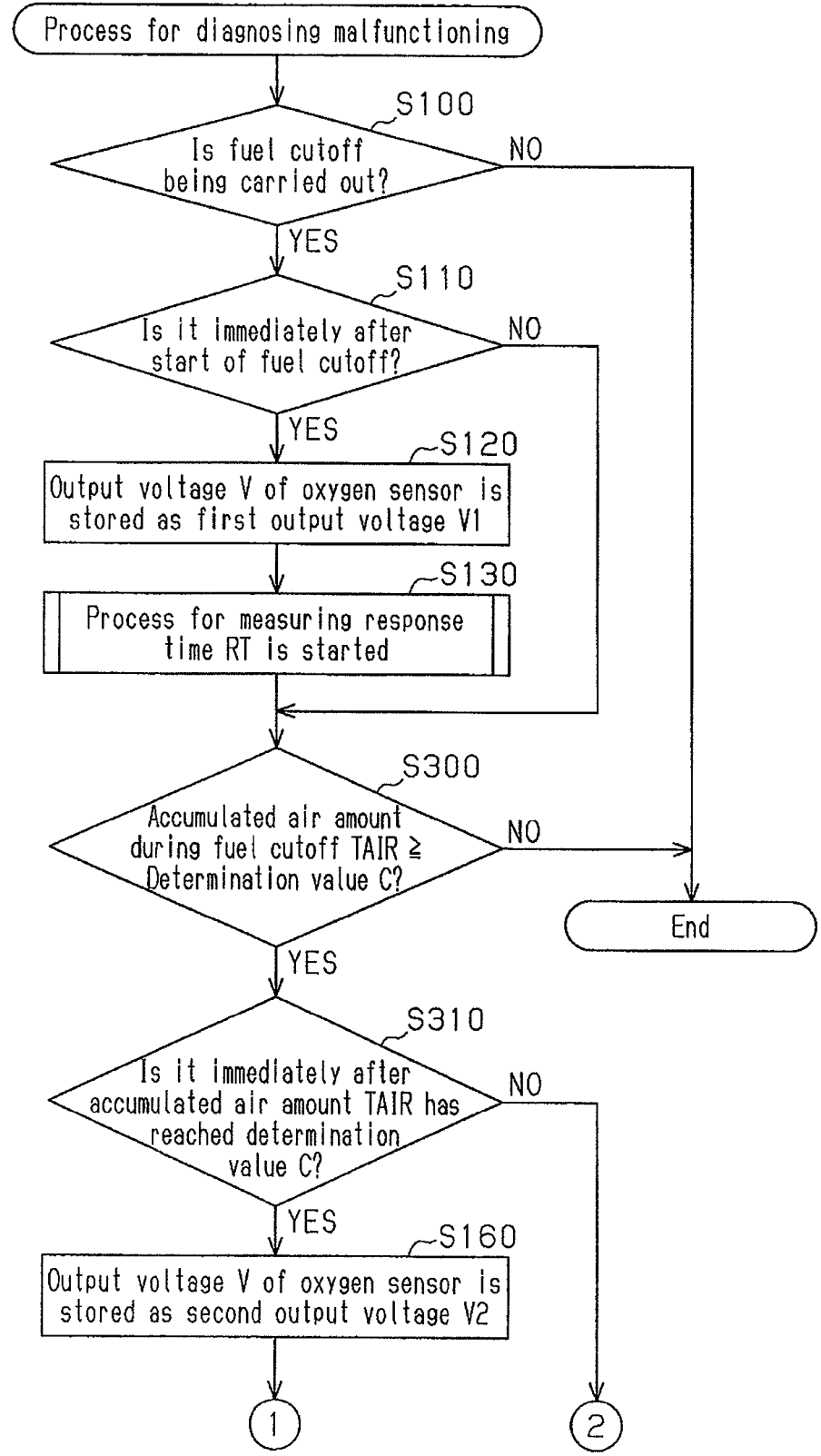
FIG. 9 is a flowchart showing a portion of a procedure of the process for diagnosing malfunctioning in the oxygen sensor according to a second embodiment.

In the process for diagnosis of malfunctioning according to the second embodiment, steps S140 and S150 in the process for diagnosis of malfunctioning described in the first embodiment are changed to steps S300 and S310, as shown in FIG. 9, and the remainder is basically the same as in the first embodiment. Therefore, the process for diagnosis of malfunctioning according to the second embodiment is described below, focusing on the above described difference.

As shown in FIG. 9, according to the second embodiment, it is determined in step S100 whether the fuel cutoff is being carried out in the current determination cycle, and in the case where it is determined that the current determination cycle is not immediately after the start of the fuel cutoff in step S110, or in the case where it is determined that the determination cycle is immediately after the start of the fuel cutoff in step 110, and the first output voltage V1 is stored in step S120 and the process for measuring the response time RT is started in step S130, step S300 is carried out.

In step S300, it is determined whether the accumulated air amount TAIR during the fuel cutoff is a determination value C or higher. The accumulated air amount TAIR is a value gained by integrating the intake air amount detected by the air flowmeter 16 after the point in time when the current determination cycle in step S110 is immediately after the start of the fuel cutoff, and the accumulated air amount TAIR from the point in time when step S300 is carried out is read into the electronic control unit 22. In addition, the determination value C is the amount of air that flows into the exhaust passage 13 after the start of the fuel cutoff and before the fresh air reaches the air-fuel ratio sensor 19, and set in advance through experiments.

In the case where it is determined that the accumulated air amount TAIR is less than the determination value C in step S300, it is determined that the fresh air coming in as a result of the fuel cutoff has not yet reached the air-fuel ratio sensor 19, and the present process is suspended.

In the case where it is determined that the accumulated air amount TAIR is the determination value C or higher in step S300, it is determined that fresh air coming in as a result of the fuel cutoff has reached the air-fuel ratio sensor 19, and the electronic control unit 22 proceeds to step S310 and determines whether it is immediately after the accumulated air amount TAIR has reached the determination value C. According to the second embodiment, step S300 is carried out in the previous determination cycle, and in the case where the determination in step S300 is affirmative for the first time in the current determination cycle, it is determined that it is immediately after the accumulated air amount TAIR has reached the determination value C. According to the second embodiment, the processes in these steps S300 and S310 correspond to the processes carried out by a first determination section.

Then, in the case where the determination is affirmative in step S310, it is determined that it is immediately after the fresh air coming in as a result of the fuel cutoff has reached the air-fuel ratio sensor 19, and the electronic control unit 22 proceeds to step S160. In step S160, the output voltage V of the oxygen sensor 20 immediately after the fresh air has reached the air-fuel ratio sensor 19 is stored in the memory of the electronic control unit 22 as the above described second output voltage V2. Then, step S170 onward shown in the previous FIG. 8, that is, the process for determining whether or not to carry out diagnosis for malfunctioning of the oxygen sensor 20 is carried out.

Figure 8:
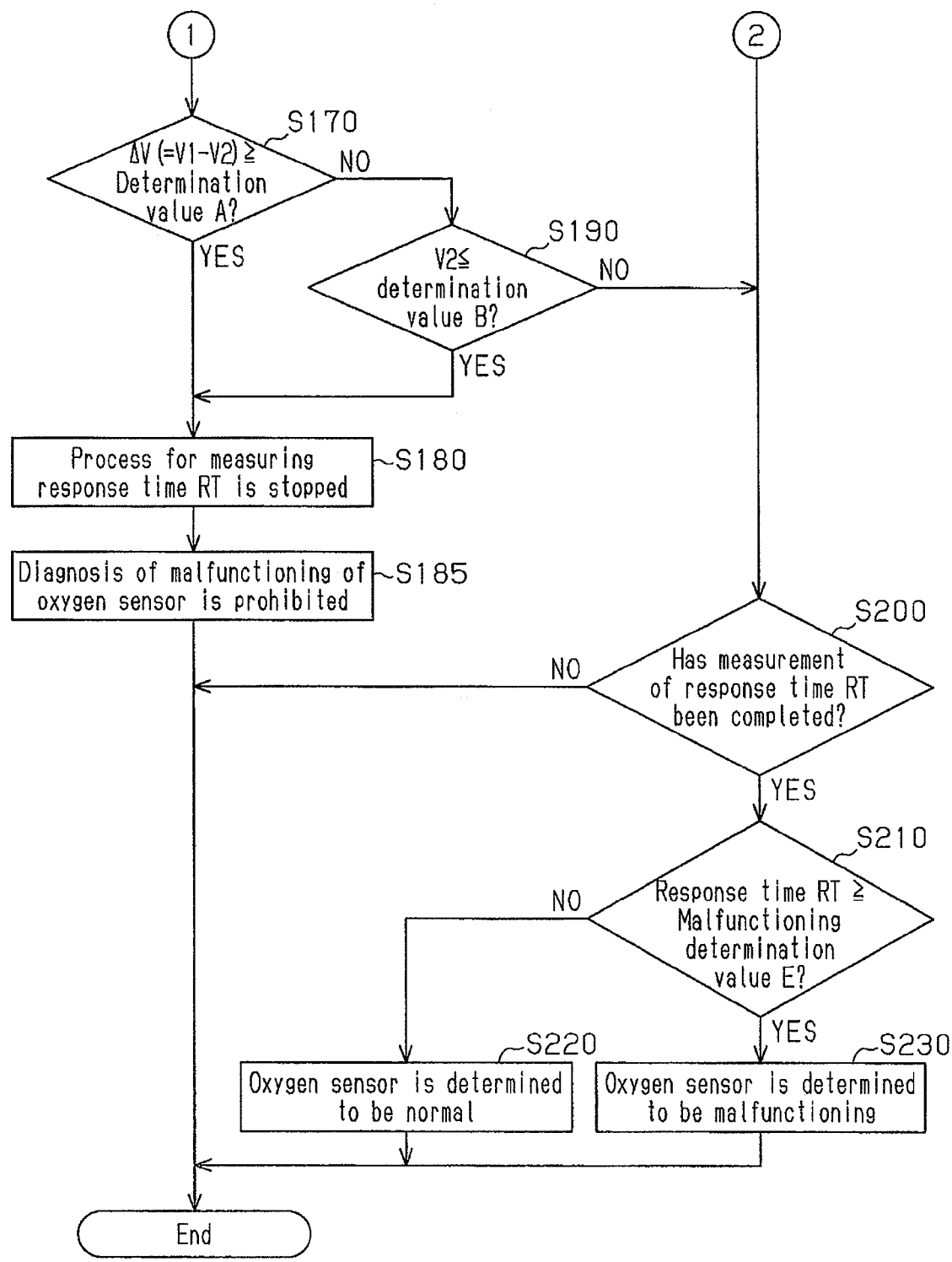
FIG. 8 is a flowchart showing the procedure of the process for diagnosing malfunctioning in the oxygen sensor according to the first embodiment.

In the case where the determination is negative in step S310, the fresh air coming in as a result of the fuel cutoff has already reached the air-fuel ratio sensor 19, and there is at that point already no possibility of the response time RT becoming long in the previous determination cycle or before, and therefore, the electronic control unit 22 carries out step S200 and the subsequent steps shown in the previous FIG. 8, that is, the process for diagnosing malfunctioning of the oxygen sensor 20.

As described above, according to the second embodiment, even in the case where the air-fuel ratio sensor 19 is malfunctioning, the arrival of fresh air at the air-fuel ratio sensor 19 is appropriately determined.

Figure 11:
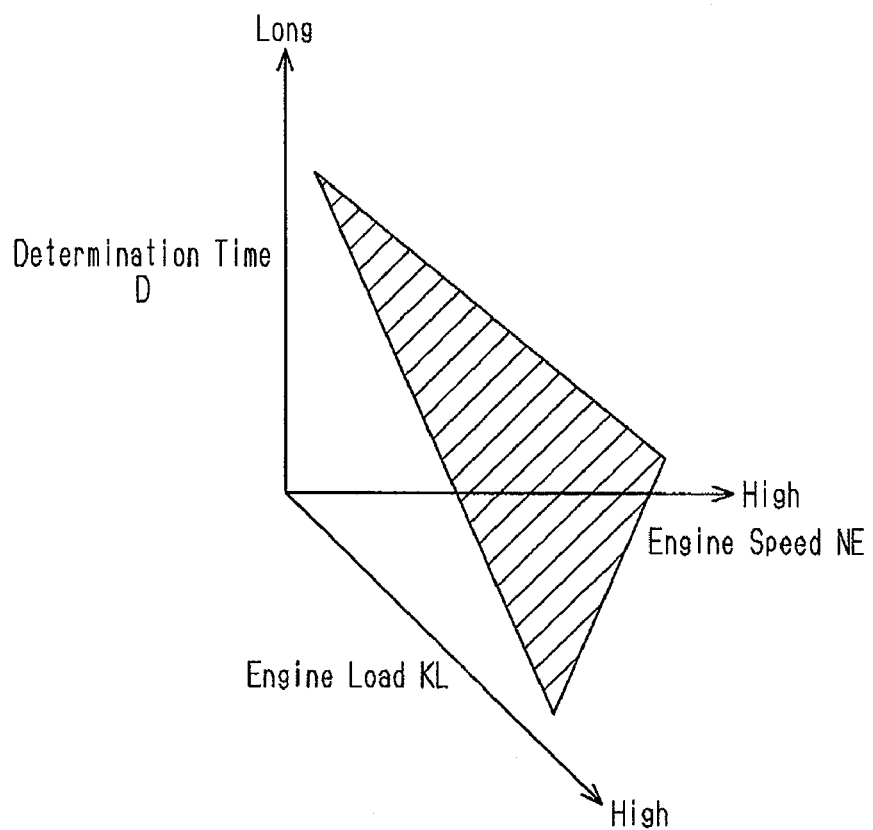
FIG. 11 is a conceptual diagram showing the manner in which a determination time is set on the basis of the rotational speed of the engine and the load of the engine according to the third embodiment.
Figure 12:
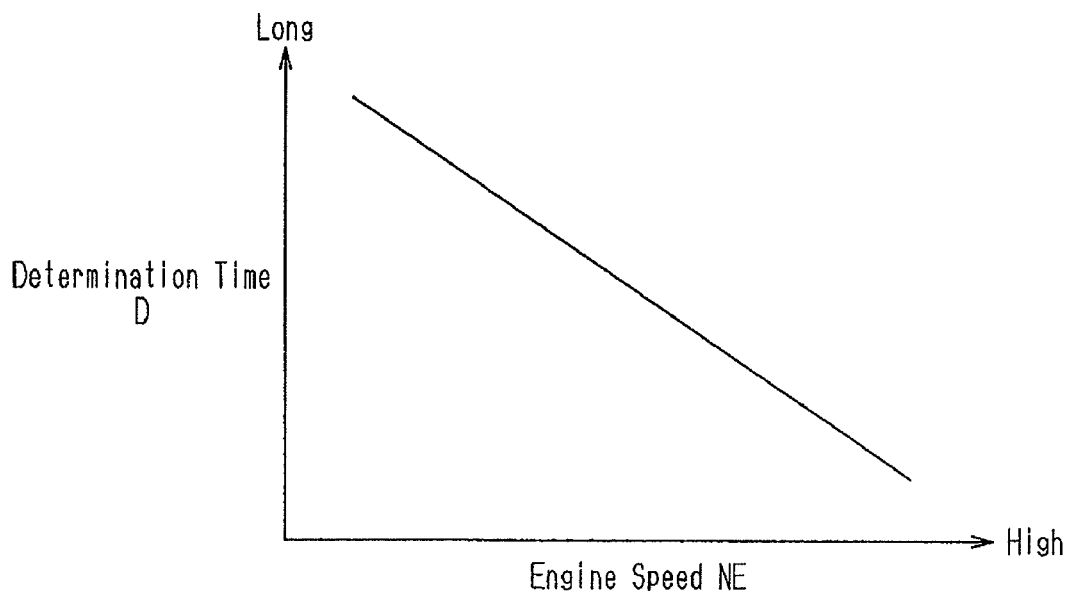
FIG. 12 is a graph showing the manner in which the determination time is set on the basis of the rotational speed of the engine according to a modification of the third embodiment.

Next, the apparatus for diagnosing malfunctioning of the oxygen sensor according to a third embodiment of this invention is described with reference to FIGS. 10 to 12.

According to the second embodiment, whether fresh air has reached the air-fuel ratio sensor 19 is determined on the basis of the accumulated air amount TAIR after the start of the fuel cutoff. In the case where the flow of the intake air amount is not uniform within the exhaust passage 13, there is a possibility that no fresh air may reach the air-fuel ratio sensor 19 even when the accumulated air amount TAIR has reached the above described determination value C. In addition, there is also a possibility of some fresh air reaching the air-fuel ratio sensor 19 before the accumulated air amount TAIR reaches the above described determination value C, and thus, there is a risk that the arrival of the fresh air at the air-fuel ratio sensor 19 may not be appropriately determined. It is also possible to determine whether the fresh air has reached the air-fuel ratio sensor 19 on the basis of the time during which the fuel cutoff is carried out. Thus, according to the third embodiment, whether the fresh air has reached the air-fuel ratio sensor 19 is determined on the basis of time during which the fuel cutoff is carried out when the process for diagnosing malfunctioning of the oxygen sensor 20 is carried out.

Figure 10:
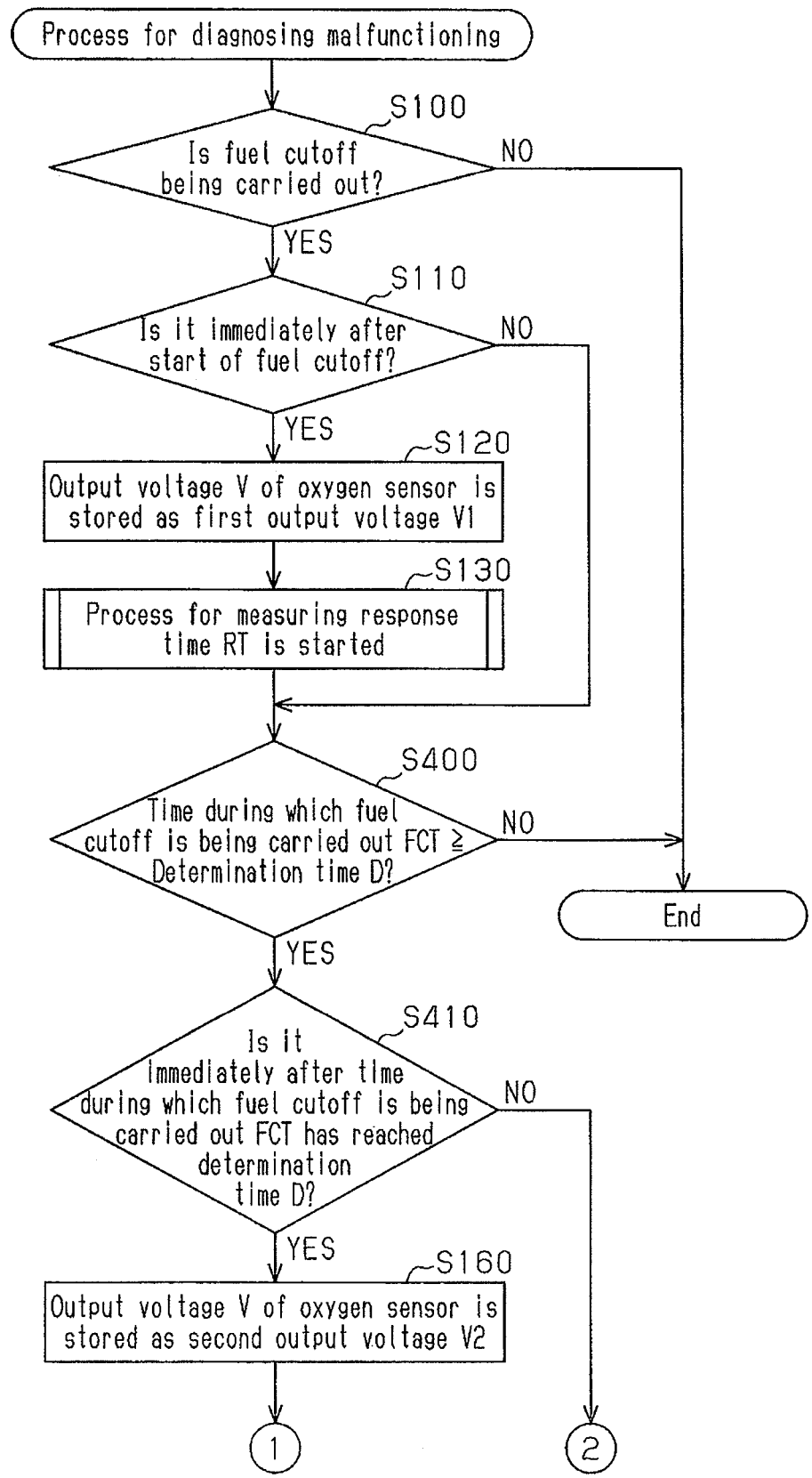
FIG. 10 is a flowchart showing a portion of the procedure of the process for diagnosing malfunctioning in the oxygen sensor according to a third embodiment.

In the process for diagnosing malfunctioning according to the third embodiment, steps S140 and S150, which are the process for diagnosing malfunctioning described in the first embodiment, are changed to the steps S400 and S410, as shown in FIG. 10, and the rest is basically the same as in the first embodiment. Therefore, in the following, the process for diagnosing malfunctioning according to the third embodiment is described focusing on the difference.

As shown in FIG. 10, according to the third embodiment, in the case where it is determined in step S100 that the fuel cutoff is being carried out in the current determination cycle, and it is determined in step S110 that the current determination cycle is not immediately after the start of the fuel cutoff, or in the case where it is determined in step 110 that the current determination cycle is immediately after the start of the fuel cutoff, and the first output voltage V1 is stored in step S120 and the process for measuring the response time RT is started in step S130, step S400 is carried out.

It is determined in step S400 whether the time during which the fuel cutoff is carried out FCT is the determination time D or longer. The time during which the fuel cutoff is carried out FCT is a value indicating the time that has elapsed after the point in time when it is determined in step S110 that it is immediately after the start of the fuel cutoff. When S400 is carried out, the time during which the fuel cutoff is carried out FCT at that point in time is read into the electronic control unit 22.

In addition, the determination time D is set as the time from the start of the fuel cutoff until when the fresh air reaches the air-fuel ratio sensor 19. The higher the engine speed NE is, or the higher the load on the engine is, the greater the intake air amount becomes. Thus, the greater the intake air amount is, the shorter the time after the start of the fuel cutoff and before the fresh air reaches the air-fuel ratio sensor 19 becomes. Therefore, as shown in FIG. 11, the determination time D is set as a variable on the basis of the engine speed NE and the load on the engine KL at the time of the start of the fuel cutoff, so that the higher the engine speed NE is, or the higher the load on the engine KL is, the shorter the determination time becomes. That is, the greater the intake air amount at the time of the start of the fuel cutoff is, the shorter the determination time becomes. As is publicly known, the load on the engine KL has a value that can be calculated on the basis of the intake air amount detected by the air flowmeter 16, the pressure within the intake passage 11 and the degree of opening of the throttle valve 15.

In the case where it is determined in step S400 that the time during which the fuel cutoff is carried out FCT is less than the determination time D, it is determined that the fresh air coming in as a result of the fuel cutoff has not yet reached the air-fuel ratio sensor 19, and the present process is suspended.

In the case where it is determined in step S400 that the time during which the fuel cutoff is carried out FCT is the determination time D or longer, it is determined that the fresh air coming in as a result of the fuel cutoff has reached the air-fuel ratio sensor 19, and the electronic control unit 22 proceeds to step 410 and determines whether it is immediately after the time during which the fuel cutoff is being carried out FCT has reached the determination time D. According to the third embodiment, step 400 is carried out in the previous determination cycle, and in the case where the determination in step S400 is affirmative for the first time in the current determination cycle, it is determined that it is immediately after the time during which the fuel cutoff is being carried out FCT has reached the determination time D. According to the third embodiment, the processes in these steps S400 and S410 correspond to the processes carried out by a first determination section.

Then, in the case where the determination is affirmative in step S410, it is determined that it is immediately after the fresh air coming in as a result of the fuel cutoff has reached the air-fuel ratio sensor 19, and the electronic control unit 22 proceeds to step S160, and the output voltage V of the oxygen sensor 20 immediately after the fresh air has reached the air-fuel ratio sensor 19 is stored in the memory of the electronic control unit 22 as the above described second output voltage V2. Then, step S170 and the subsequent steps shown in the previous FIG. 8 are carried out, that is, the process for determining whether or not to carry out diagnosis of malfunctioning of the oxygen sensor 20 is carried out.

In the case where the determination is negative in step S410, the fresh air coming in as a result of the fuel cutoff has already reached the air-fuel ratio sensor 19, and there is at that point already no possibility of the response time RT becoming long in the previous determination cycle or before, and therefore, the electronic control unit 22 carries out step S200 and the subsequent steps shown in the previous FIG. 8, that is, the process for diagnosing malfunctioning of the oxygen sensor 20.

As described above, according to the third embodiment, whether fresh air has reached the air-fuel ratio sensor 19 is appropriately determined without the determination being affected by the draft of the intake air amount within the exhaust passage.

In addition, the above described determination time D is set as a variable so that the higher the engine speed NE is and the higher the load on the engine KL is, that is, the greater the intake air amount is, the shorter the determination time D becomes. Therefore, the determination time D is set with high accuracy, and as thus, whether the fresh air has reached the air-fuel ratio sensor 19 is determined with high accuracy.

Incidentally, according to the third embodiment, it is also possible to appropriately determine the arrival of fresh air at the air-fuel ratio sensor 19, even in the case where the air-fuel ratio sensor 19 is malfunctioning.

It should be apparent to those skilled in the art that the present invention may be embodied in many other specific forms without departing from the spirit or scope of the invention. Particularly, it should be understood that the invention may be embodied in the following forms.

When the output difference ΔV is less than the determination value A, the second output voltage V2 and the determination value B are compared, and in the case where the second output voltage V2 is the determination value B or less, diagnosis for malfunctioning of the oxygen sensor 20 is prohibited. In addition, whether the second output voltage V2 is the determination value B or less is determined, and when the second output voltage V2 exceeds the determination value B, the output difference ΔV and the determination value A are compared. Then, in the case where the output difference ΔV is the determination value A or higher, diagnosis for malfunctioning of the oxygen sensor 20 may be prohibited.

Although whether diagnosis for malfunctioning is carried out is determined on the basis of the second output voltage V2 and the output difference ΔV between the first output voltage V1 and the second output voltage V2, the determination may be made on the basis of only the output difference ΔV. In addition, the determination may be made on the basis of only the second output voltage V2.

Although the first value is set to "0.35 V" and the second value is set to "0.2 V" when the response time RT is measured, values other than these may be set.

Figure 13:
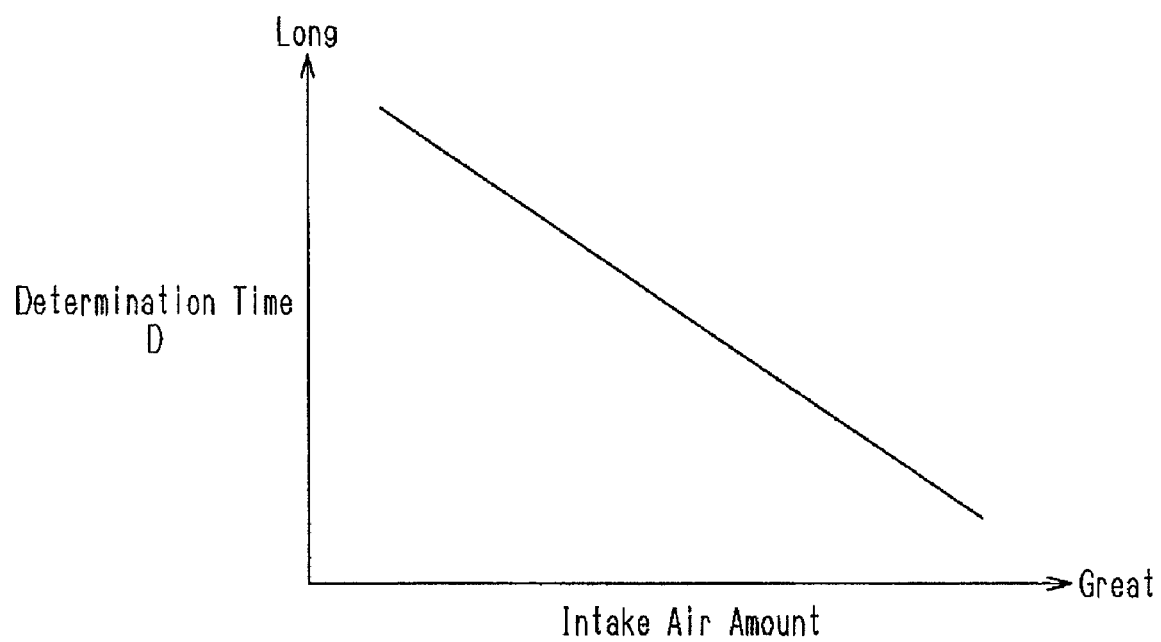
FIG. 13 is a graph showing the manner in which the determination time is set on the basis of the intake air amount actually detected according to a modification of the third embodiment.

According to the third embodiment, the determination time D is set as a variable on the basis of the engine speed NE and the load on the engine KL. In addition to this, the determination time D may be set as a variable on the basis of only the engine speed NE, so that the configuration is simplified. In this case, as shown in FIG. 12, the determination time D is set as a variable, so that the higher the engine speed NE is, the shorter the determination time D becomes, and thus, whether the fresh air has reached the air-fuel ratio sensor 19 is appropriately determined. In addition, the determination time D may be set as a variable on the basis of the actual intake air amount which is detected by the intake air amount detector, for example, the air flowmeter 16. In this case, as shown in FIG. 13, the determination time D is set as a variable, so that the greater the actual intake air amount is at the time of the start of the fuel cutoff, the shorter the determination time D becomes. Thus, the determination time D is set directly on the basis of the actual intake air amount, and the determination time D is set with high accuracy. As a result, whether the fresh air has reached the air-fuel ratio sensor 19 is determined with high accuracy. The intake air amount detector is not limited to the above described air flowmeter 16, and any device which can detect the intake air amount may be used, and an intake pressure sensor for detecting the intake pressure within the intake passage 11, a vane type air flowmeter or a Karman vortex type air flow meter may be used, for example.

In the case where an oxygen concentration sensor which is different from the air-fuel ratio sensor 19, for example, a sensor having the same structure as the oxygen sensor 20, is provided in the section of the exhaust passage 13 on the upstream side of the catalyst 18, the present invention may be applied in the same manner. In addition, in the case where an oxygen concentration sensor which is different from the oxygen sensor 20, for example a sensor having the same structure as the air-fuel ratio sensor 19, is provided in the section of the exhaust passage 13 on the downstream side of the catalyst 18, the present invention may be applied in the same manner.

The present examples and embodiments are to be considered as illustrative and not restrictive and the invention is not to be limited to the details given herein, but may be modified within the scope and equivalence of the appended claims.

The invention claimed is:

1. An apparatus for diagnosing malfunctioning, which is applied to an internal combustion engine having a catalyst provided in an exhaust passage for purifying exhaust, an upstream oxygen concentration sensor provided in a section of the exhaust passage on the upstream side of the catalyst, and a downstream oxygen concentration sensor provided in a section of the exhaust passage on the downstream side of the catalyst, and wherein the apparatus diagnoses whether a downstream oxygen concentration sensor is malfunctioning on the basis of a change in an output value of the downstream oxygen concentration sensor within a predetermined period of time after the output value has started changing toward a lean side after the start of fuel cutoff, the apparatus comprising:

a first determination section for determining whether fresh air has reached the upstream oxygen concentration sensor after the start of the fuel cutoff; and a second determination section for determining whether or not to carry out the diagnosis of malfunctioning on the basis of the output value of the downstream oxygen concentration sensor immediately after the first determination section determines that fresh air has reached the upstream oxygen concentration sensor.

2. The apparatus according to claim 1, wherein the second determination section prohibits the malfunctioning diagnosis from being carried out when the output value of the downstream oxygen concentration sensor immediately after it is determined that fresh air has reached the upstream oxygen concentration sensor is a predetermined determination value or less.

3. The apparatus according to claim 1, wherein the first determination section determines that fresh air has reached the upstream oxygen concentration sensor when the output value of the upstream oxygen concentration sensor indicates that the air-fuel ratio is lean.

4. The apparatus according to claim 1, wherein the first determination section determines that fresh air has reached the upstream oxygen concentration sensor when an accumulated intake air amount from when the fuel cutoff is started has reached a predetermined determination value.

5. The apparatus according to claim 1, wherein the first determination section determines that fresh air has reached the upstream oxygen concentration sensor when time during which the fuel cutoff is being carried out has reached a predetermined determination time.

6. The apparatus according to claim 5, wherein the determination time is set as a variable such that the higher the rotational speed of the engine is, the shorter the determination time becomes.

7. The apparatus according to claim 5, wherein the determination time is set as a variable such that the higher the rotational speed of the engine or the load on the engine is, the shorter the determination time becomes.

8. The apparatus according to claim 5, wherein the determination time is set as a variable such that the greater the intake air amount detected by the intake air amount detector is, the shorter the determination time becomes.

9. An apparatus for diagnosing malfunctioning, which is applied to an internal combustion engine having a catalyst provided in an exhaust passage for purifying exhaust, an upstream oxygen concentration sensor provided in a section of the exhaust passage on the upstream side of the catalyst, and a downstream oxygen concentration sensor provided in a section of the exhaust passage on the downstream side of the catalyst, and wherein the apparatus diagnoses whether a downstream oxygen concentration sensor is malfunctioning on the basis of a change in an output value of the downstream oxygen concentration sensor within a predetermined period of time after the output value has started changing toward a lean side after the start of fuel cutoff, the apparatus comprising:

a first determination section for determining whether fresh air has reached the upstream oxygen concentration sensor after the start of the fuel cutoff; and a second determination section for determining whether or not to carry out the diagnosis of malfunctioning on the basis of a first output value, which is an output value of the downstream oxygen concentration sensor immediately after the start of the fuel cutoff, and a second output value, which is an output value of the downstream oxygen concentration sensor immediately after the first determination section has determined that fresh air has reached the upstream oxygen concentration sensor.

10. The apparatus according to claim 9, wherein the second determination section prohibits the malfunctioning diagnosis from being carried out when the difference between the first output value and the second output value is a predetermined determination value or greater.

11. The apparatus according to claim 10, wherein, when the difference between the first output value and the second output value is less than the predetermined determination value, the second determination section compares the second output value with a predetermined second determination value, and wherein, when the second output value is the second determination value or less, the second determination section prohibits the malfunctioning diagnosis from being carried out.

12. The apparatus according to claim 9, wherein the first determination section determines that fresh air has reached the upstream oxygen concentration sensor when the output value of the upstream oxygen concentration sensor indicates that the air-fuel ratio is lean.

13. The apparatus according to claim 9, wherein the first determination section determines that fresh air has reached the upstream oxygen concentration sensor when an accumulated intake air amount from when the fuel cutoff is started has reached a predetermined determination value.

14. The apparatus according to claim 9, wherein the first determination section determines that fresh air has reached the upstream oxygen concentration sensor when the time during which the fuel cutoff is being carried out has reached a predetermined determination time.

15. The apparatus according to claim 14, wherein the determination time is set as a variable such that the higher the rotational speed of the engine is, the shorter the determination time becomes.

16. The apparatus according to claim 14, wherein the determination time is set as a variable such that the higher the rotational speed of the engine or the load on the engine is, the shorter the determination time becomes.

17. The apparatus according to claim 14, wherein the determination time is set as a variable such that the greater the intake air amount detected by the intake air amount detector is, the shorter the determination time becomes.

* * * * *